March 20, 1928.
H. R. BAETH
1,663,152
GATE LATCH
Filed May 25, 1926
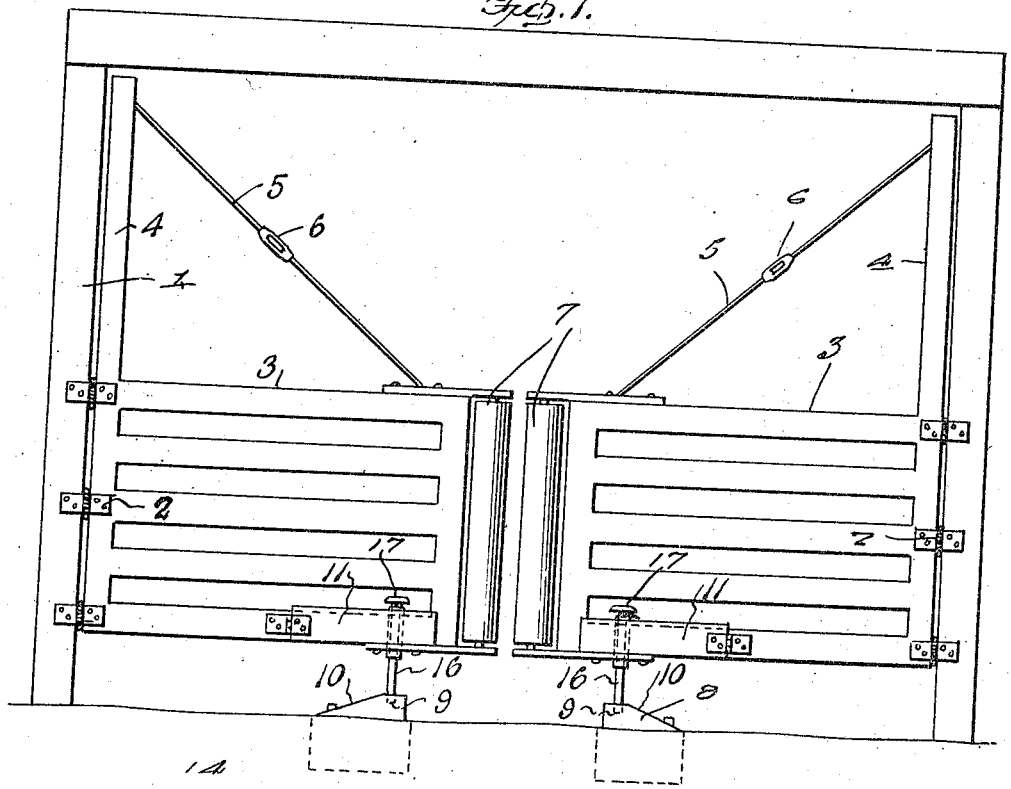
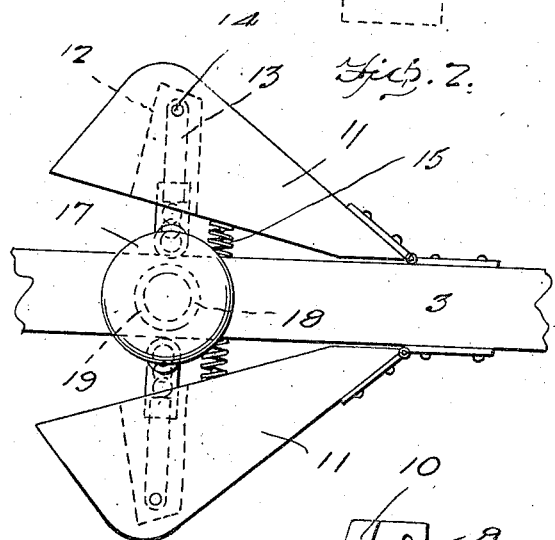
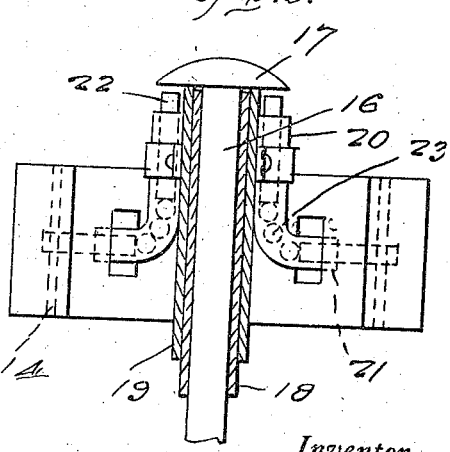
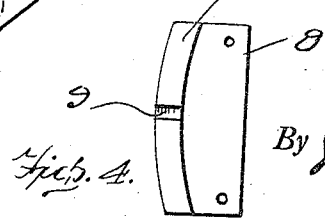
Inventor
H. R. Baeth
By Clarence A. O'Brien
Attorney Patented Mar. 20, 1928.

1,663,152

UNITED STATES PATENT OFFICE.

HENRY R. BAETH, OF CONTENT, MONTANA.

GATE LATCH.

Application filed May 25, 1926. Serial No. 111,590.

My present invention has to do with gates constructed and arranged to be unlatched and moved open by abutting automobiles; and it has for its general object the provision of a peculiar and advantageous gate structure of the kind indicated.

To the attainment of the foregoing, the invention consists in the improvement as hereinafter described and definitely claimed.

In the accompanying drawings, forming part of this specification:—

Figure 1 is a general view showing the gate structure constituting the preferred embodiment of my invention.

Figure 2 is an enlarged fragmentary plan view showing the unlatching means for one of the gate sections.

Figure 3 is an enlarged section taken through the said means.

Figure 4 is one of the stationary keepers for the gate sections.

Similar numerals of reference designate corresponding parts in all of the views of the drawings.

I show in Figure 1, upright posts 1 at opposite sides of a gateway, and connected by hinges 2 to the said posts 1 are the sections 3 of my novel gate, the said sections having upwardly reaching end uprights 4 and being equipped with diagonal brace rods 5 having turnbuckles 6, whereby the gate sections 3 may be effectively adjusted to correct sagging. The hinges 2 are preferably spring hinges, and therefore it will be understood that each gate section 3 will by the hinges be returned to and yieldingly maintained in the positions shown in Figure 1. The confronting ends of the gate sections 3 are equipped with upright rollers 7 which are of rubber or are rubber faced and are designed to engage the running board of an automobile passing through the gateway, this with a view to averting injury to the passing automobile by the gate sections 3.

Appropriately secured in the ground at opposite sides of the longitudinal center of the gateway are keepers 8, each of the said keepers 8 having a seat 9 and inclined portions 10 extending upwardly toward the said seat, Figures 1 and 4.

Arranged at opposite sides of each gate section 3 are swingable unlatching members 11, each of the said members 11 being chambered as designated by 12 and being equipped in the chamber with a horizontally swingable bolt 13, pivoted at 14. The said unlatching members 11 are normally maintained in the positions shown in Figure 2 by springs 15 interposed between their inner sides and the opposed sides of the gate sections 3.

Appropriately guided in the gate sections 3 are upright latching bolts 16 with heads 17 at their upper ends. The bolts 16 are preferably disposed in upright sleeves 18, and surrounding the sleeves 18 are sleeves 19 by which are carried upright tubes 20 with lateral oppositely directed horizontal portions 21 at their lower ends, the said portions 21 receiving the free end portions of the bolts 13. Guided in the upright portions of the tubes 20 are plungers 22 arranged under the heads 17 of the latch bolts 16, and disposed in the portions 20 and 21 of the tubes are anti-friction devices, preferably in the form of balls and designated by 23. Manifestly when an automobile abuts against and moves toward the gate sections 3 the unlatching members 11 at one side of said gate sections 3 by moving the bolts 13 will operate to move the series of anti-friction devices 23 upwardly, and the said anti-friction devices, in turn, will raise the plungers 22 whereupon through the medium of the said plungers 22 in cooperation with the heads 17 of the bolts 16, the said bolts 16 will be lifted from the seats 9 of the keepers 8, with the result that the gate sections 3 will be swung open in front of the automobile, and as the automobile passes through the gateway, the rollers 7 will wipe against the running boards of the automobile, and when the automobile clears the gate sections, the spring hinges will operate to return the gate sections 3 to the positions shown in Figure 1 in which positions the gate sections 3 will be automatically secured by the placing of the latching bolts 16 in the seats 9 of the keepers 8.

It will be apparent from the foregoing that my novel gate structure is simple and durable in construction and is reliable in operation, and that the operation of the gate is of such character that an automobile will be retarded but slightly in order to unlatch and open and pass the gate sections 3. It will also be apparent that the gate sections 3 are adapted to be unlatched and opened in the manner described by an automobile approaching at either side of the gate sections 3.

I have specifically described the construction and relative arrangement embraced in the present and preferred embodiment of my invention in order to impart a full, clear and exact understanding of the said embodiment. I do not desire, however, to be understood as limiting myself to the precise construction and arrangement disclosed, my invention being defined by my appended claim within the scope of which modifications may be made without departure from my invention.

Having described my invention, what I claim and desire to secure by Letters Patent, is:—

In combination, a keeper in a gate way, a horizontally swingable gate, a horizontally swingable chambered unlatching member hingedly connected at one end to the gate and arranged at one side of the gate and offering an abutment to an approaching automobile, an upright sleeve carried by the gate, a tube carried by said sleeve and having an upright portion in parallelism to the sleeve and also having a lateral portion, an upright latching bolt movable rectilinearly in said sleeve and having a horizontally disposed head above the sleeve, a plunger connected to the unlatching member and arranged therein and disposed and movable in the lateral portion of said tube, an upright plunger arranged in the upright portion of the tube and arranged when raised to act against said head and raise said latching bolt, and anti-friction units in the tube and interposed between the plunger on the swingable member and the upright plunger.

In testimony whereof I affix my signature.

HENRY R. BAETH.